(12) United States Patent
Takeda et al.

(10) Patent No.: US 6,264,721 B1
(45) Date of Patent: Jul. 24, 2001

(54) METHOD OF OPERATING ROTARY HEARTH FURNACE FOR REDUCING OXIDES

(75) Inventors: Kanji Takeda; Yoshitaka Sawa; Tetsuya Yamamoto, all of Chiba (JP)

(73) Assignee: Kawasaki Steel Corporation (JP)

( * ) Notice: Subject to any disclaimer, the term of this patent is extended or adjusted under 35 U.S.C. 154(b) by 0 days.

(21) Appl. No.: 09/308,870

(22) PCT Filed: Mar. 27, 1998

(86) PCT No.: PCT/JP98/01398

§ 371 Date: May 26, 1999

§ 102(e) Date: May 26, 1999

(87) PCT Pub. No.: WO99/16912

PCT Pub. Date: Apr. 8, 1999

(30) Foreign Application Priority Data

Sep. 30, 1997 (JP) .................................................. 9-265409

(51) Int. Cl.[7] .................................................. C21B 13/08
(52) U.S. Cl. .................................................. 75/414; 75/484
(58) Field of Search ........................................ 75/414, 484

(56) References Cited

U.S. PATENT DOCUMENTS 3,770,417 * 11/1973 Kranz ...................................... 75/484
5,637,133 * 6/1997 Munnix et al. ........................ 75/484

* cited by examiner

*Primary Examiner*—Melvyn Andrews
(74) *Attorney, Agent, or Firm*—Schnader Harrison Segal & Lewis LLP (57) ABSTRACT

A mixed layer of fine ore and coal char and a layer of fine coal are stacked on a hearth in the form of separate layers from each other. The fine ore is reduced while fine coal is pyrolyzed to produce coal char. The produced coal char is used repeatedly.

5 Claims, 7 Drawing Sheets

ROTATING DIRECTION
OF FURNACE FLOOR

7

(b)

7

METHOD OF OPERATING ROTARY HEARTH FURNACE FOR REDUCING OXIDES

TECHNICAL FIELD

The present invention relates to a technique for producing reduced iron from iron ore by using a movable hearth furnace.

BACKGROUND ART

Crude steel is produced primarily by two methods; i.e., a blast-furnace/converter process and an electric furnace process. Of these methods, according to the electric furnace process, steel is manufactured by using scrap and reduced iron as iron feed stock, heating and melting them with electrical energy, and then refining the melted iron in some cases. At the present, scraps is a main feed stock. Recently, however, demand for reduced iron has increased due to a reduction in supply of scrap and a trend toward manufacture of high-grade products using the electric furnace process.

Figure 1:
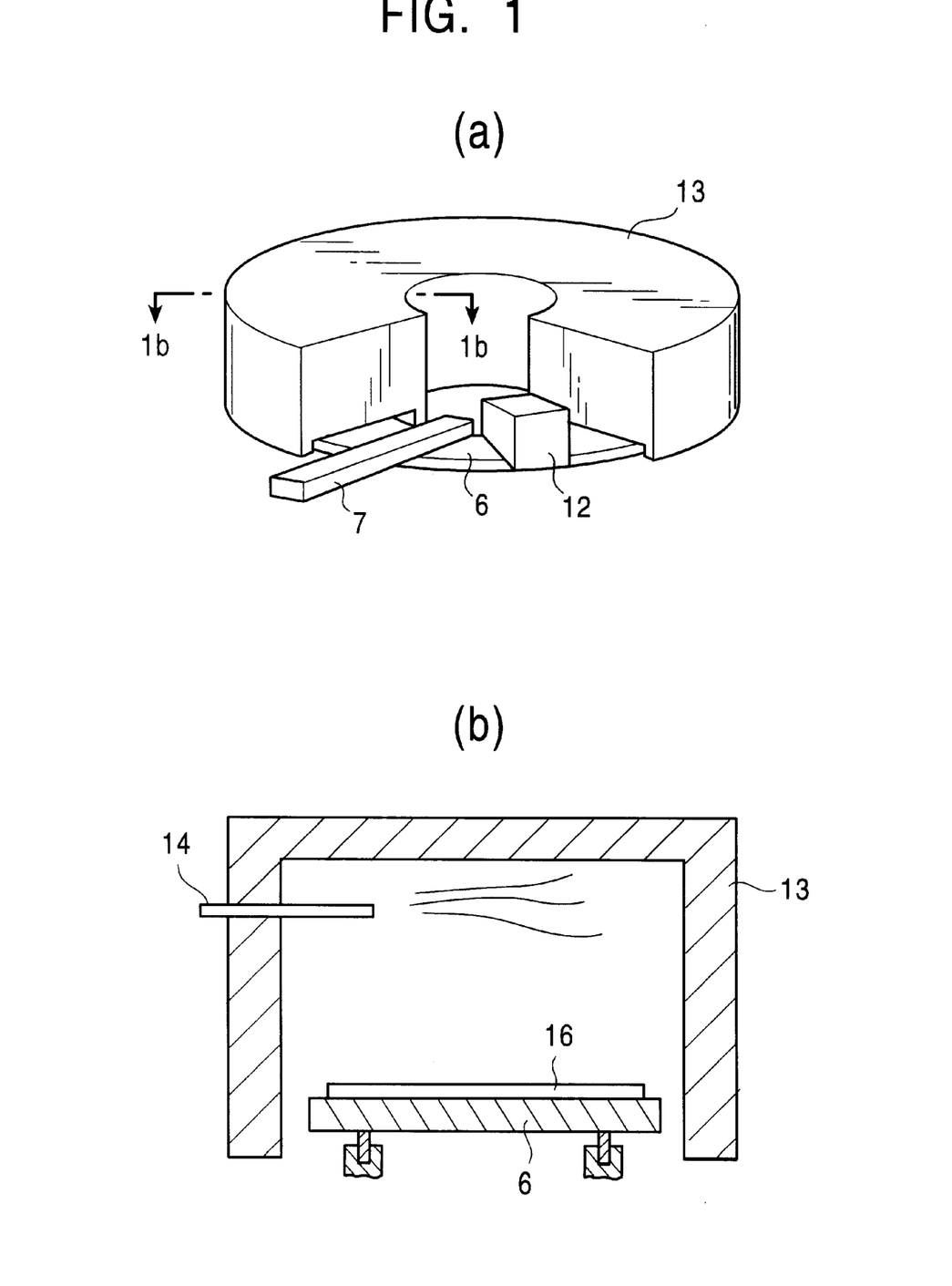

As one of known processes for producing reduced iron, Japanese Unexamined Patent Publication No. 63-108188 discloses a process comprising the steps of stacking a layer formed of iron ore and a solid reducing material on a hearth rotating horizontally, and heating the iron ore with radiant heat transfer from above to thereby reduce it. In many cases, the hearth rotating horizontally is constructed as shown in FIGS. 1 (a) and (b) which are explanatory view of a rotary hearth furnace. A layer 16 formed of iron ore and a solid reducing material is stacked on a moving (rotary) hearth 6 by using a charging apparatus 12. The moving hearth 6 is surrounded by a furnace body 13 including refractories set on its inner surface. A burner 14 is installed in an upper portion of the furnace and serves as a heat source for reducing the iron ore on the moving hearth 6. A temperature in the furnace is usually held at 1300° C. or thereabout. Also, it is usual that, after the end of the reducing operation, the reduced iron is cooled with a cooler while remaining on the moving hearth, and then recovered for the purposes of preventing oxidization of the reduced iron outside the furnace and ensuring easier handling in subsequent steps. The above-stated process is advantageous because, for example, relatively less troubles occurred during the operation. Meanwhile, from the standpoint of aiming to improve productivity with the temperature in the furnace kept constant, the productivity of reduced iron in the above-stated process greatly depends on the amount of ore stacked on the hearth per unit area, the residence time of the ore in the furnace, and the area of the hearth. If the amount of ore stacked on the hearth per unit area can be increased, i.e., if the thickness of the ore layer can be enlarged, an output is expected to increase. In the case of heating the ore layer from only its upper surface as with the above-stated process, however, a very long time is required to heat the ore layer until its lower portion is heated; hence it is impossible to increase the productivity actually. Also, shortening of the residence time of the ore in the furnace contributes to increasing the output, but if the residence time is simply shortened, the ore is not sufficiently reduced and cannot convert into reduced iron. For those reasons, there has been a continuing problem that, to increase an output of reduced iron per one unit of equipment, a considerably large hearth area is required and large-scale equipment is needed.

DISCLOSURE OF THE INVENTION

The present invention intends to solve the problem set forth above, and its object is to provide a method of operating a movable hearth furnace, wherein fine ore, fine coal and coal char are used as feed stock (the term "feed stock" used here means fine ore, fine coal and coal char which are supplied to the furnace), the feed stock are stacked in the form of layers on a hearth rotating horizontally, and iron ore is heated and reduced with radiant heat transfer from above, the method being able to reduce as far as possible the size of equipment needed for implementing the method, or to increase an output of reduced iron per unit of equipment having the same scale; that is, the method being superior in productivity and economy. To achieve the above object, a mixed layer of fine ore and coal char and a layer of fine coal are stacked on a hearth in the form of separate layers from each other. The fine ore is reduced while fine coal is pyrolyzed to produce coal char. The produced coal char is used repeatedly.

BRIEF DESCRIPTION OF THE DRAWINGS

FIG. 1 is an explanatory view of a rotary hearth furnace in which: FIG. 1(a) is a perspective view and FIG. 1(b) is a cross-sectional view along the line 1(b)–1(b).

The following reference numerals show layers and components in FIGS. 2–8:

1 mixed layer of fine ore and fine coal char
2 layer of fine coal
3 mixed layer of fine coal and fine coal char
4 mixed layer of fine ore and fine coal
5 mixed layer of fine ore, fine coal and fine coal char
6 moving hearth (rotary hearth)
7 discharging apparatus
8 reduced iron
9 fine coal char
10 fine coal
11 fine ore 12 charging apparatus (apparatus for stacking feed stock the hearth)
13 furnace body
14 burner
15 cooler
16 layer formed of iron ore and solid reducing material

BEST MODE OF CARRYING OUT THE INVENTION

Coal contains volatile matter usually in the range of about 15~45% depending on the kind of coal. When coal is heated up to high temperatures while air is kept cut off, the coal starts pyrolysis at a temperature around 300° C. and then softens to melt while generating gas mainly comprising $CH_4$ and homologues thereof. Upon reaching a temperature around 500° C., most of the melted coal is solidified to become coal char in the form of a porous mass. The pyrolysis of coal continues with a subsequent rise of temperature and generational gas is changed to $H_2$ at a temperature around 700° C. Then, the pyrolysis is almost ended at temperatures of not lower than 900° C. The pyrolysis of coal is an endothermic reaction, and heat must be supplied externally to continue the progress of the reaction.

On the other hand, when a mixture of fine ore and a solid carbonacious material (solid reducing material) is reduced by external heating, reduction of the fine ore proceeds in the form of direct reduction at temperatures of not lower than about 1000° C. This reducing reaction is also an endothermic reaction, and heat must be supplied externally to continue the progress of the reaction. To increase the productivity of reduced iron, therefore, it is important how to reach temperatures (not lower than about 1000° C.) allowing the reduction to proceed as early as possible.

Turning now to the case where a mixed layer of fine ore and fine coal is stacked on a hearth that is moving horizontally, and the ore on the hearth is reduced by radiant heat transfer from an upper portion of a furnace, the radiant heat transfer from the upper portion of the furnace is ineffective to heat the ore for reducing it, i.e., to heat the mixed layer of fine ore and fine coal up to temperatures of not lower than about 1000° C. allowing the reduction of the ore to proceed. Because of coal being present in the mixed layer, however, the coal starts pyrolysis before reaching the temperature of 1000° C. The pyrolysis of coal is an endothermic reaction as stated above. Thus, the pyrolysis of coal prolongs the period of time required to reach the temperature of 1000° C. and hence lowers the productivity correspondingly. In view of the above, a lowering of the productivity can be avoided by reducing the ore in a zone where the reduction is not affected by heat absorption incidental to the pyrolysis of coal.

In accordance with the above consideration, the present invention is based on the concept of separating the process into a zone where the reduction of ore proceeds and a different zone where the pyrolysis of coal proceeds. More specifically, in the present invention, a mixed layer of fine ore and coal char having finished pyrolysis and a layer of fine coal are stacked on a hearth as separate layers from each other so that the fine ore is reduced by the coal char while the fine coal is pyrolyzed to turn into coal char. In addition, the obtained coal char is utilized in a subsequent operation for reducing the fine ore.

Figure 2:
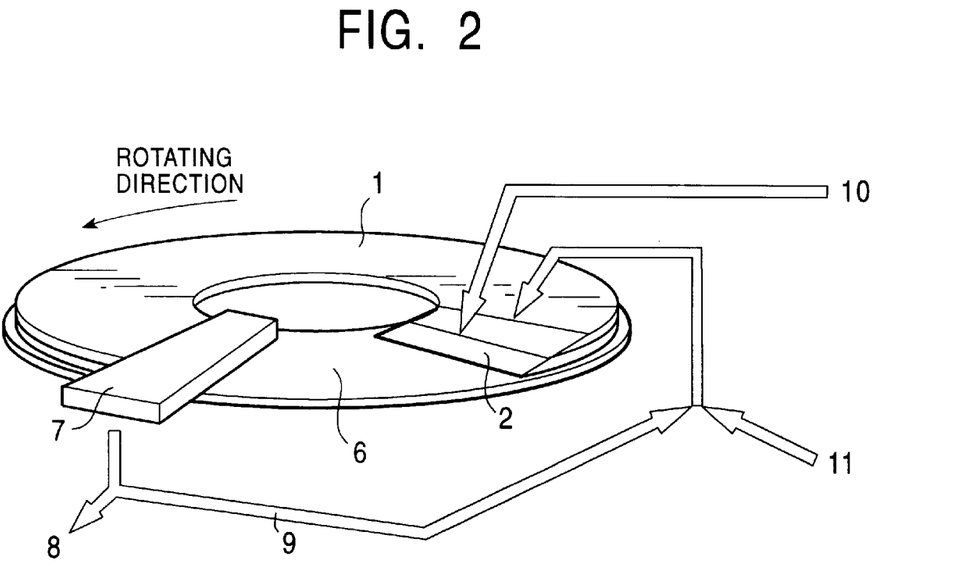
FIG. 2 is a view explaining the overall flow of a method according to the present invention.

FIG. 2 is a view explaining an overall flow of a method according to the present invention. In FIG. 2, a mixed layer 1 of fine ore 11 and coal char 9 lies on a layer 2 of fine coal 10, these two layers 1 and 2 being stacked on a moving hearth 6, which is rotatable horizontally, as separate layers from each other. Then, reduced iron 8 that has resulted from the reduction of the ore and the coal char 9 having finished the pyrolysis, are both discharged and recovered by an discharging apparatus 7. Of the discharged substances, the coal char 9 is recycled to be mixed with the fine ore 11 and used as the coal char 9 of the mixed layer 1. To thus make the zone where the reduction of ore proceeds and the zone where the pyrolysis of coal proceeds separate from each other, the fine coal 10 is stacked on the hearth 6 as a separate layer (fine coal layer 2) without mixing with the fine ore 11. The fine coal 10 is heated in the furnace and starts pyrolysis. However, because the fine coal 10 is not mixed with the fine ore 11, the temperature rise of the fine ore 11 is affected in no way or to a very small extent, if so, by heat absorption incidental to the pyrolysis of the fine coal 10.

On the other hand, reduction of the fine ore 11 requires some solid carbonacious material to be mixed with the fine ore 11. To that end, the coal char 9, having finished its pyrolysis, is used as a solid charcoal material and is mixed with the fine ore 11 (i.e., the mixed layer 1 of the fine ore and the coal char). Since the coal char 9 has already finished its pyrolysis, there occurs no endothermic reaction, which otherwise could delay the temperature rise of the mixed layer 1 of the fine ore 11 and the coal char 9. In addition, the coal char 9 obtained through pyrolysis of the fine coal 10 in the preceding cycle of operation is recycled; namely, it can be advantageously recovered as the coal char 9 recycles for use in the subsequent cycles of operation.

Also, it is of course more preferable that the coal char mixed with the fine ore is sufficiently carbonized and develops the least possible heat absorption incidental to pyrolysis when used as the mixed layer of the fine ore and the coal char. To that end, the coal char is mixed in the layer of fine coal while part of the coal char having finished its pyrolysis in the furnace is recycled as the mixed coal char. Comparing with the case of the coal char not being mixed in the layer of fine coal, the residence time of coal in the furnace per unit weight of the coal is prolonged and a coal char that has finished its pyrolysis more completely can be obtained.

As explained above, with the present invention, the reduced metal and coal char are both produced in the same furnace. Accordingly, volatile matter generated from the coal reacts with an oxidation gas, such as air, supplied from a burner so as to efficiently serve as a heat source. Further, comparing with the case of producing coal char using a separate apparatus outside the furnace, the present invention is advantageous in that equipment cost can be reduced, total heat loss can be lessened, and volatile matter generated from the coal can be effectively utilized.

Examples

Figure 3:
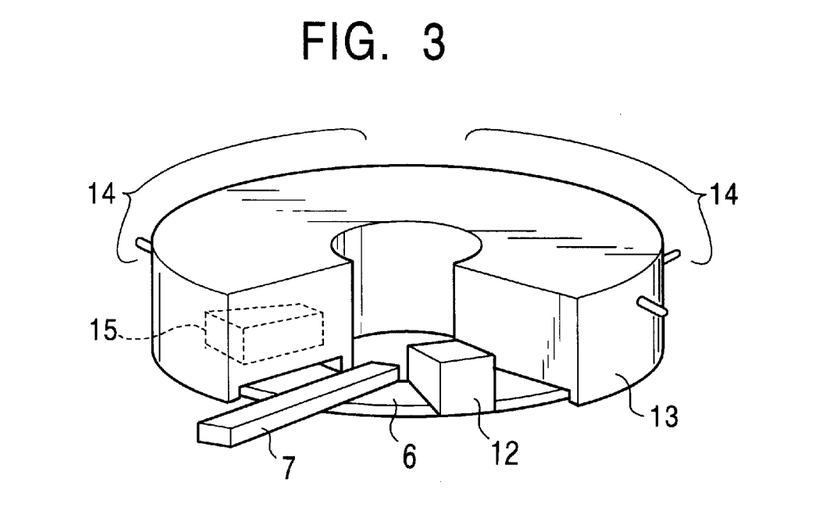
FIG. 3 is an explanatory view of a rotary hearth furnace used in an embodiment of this invention.
Figure 4:
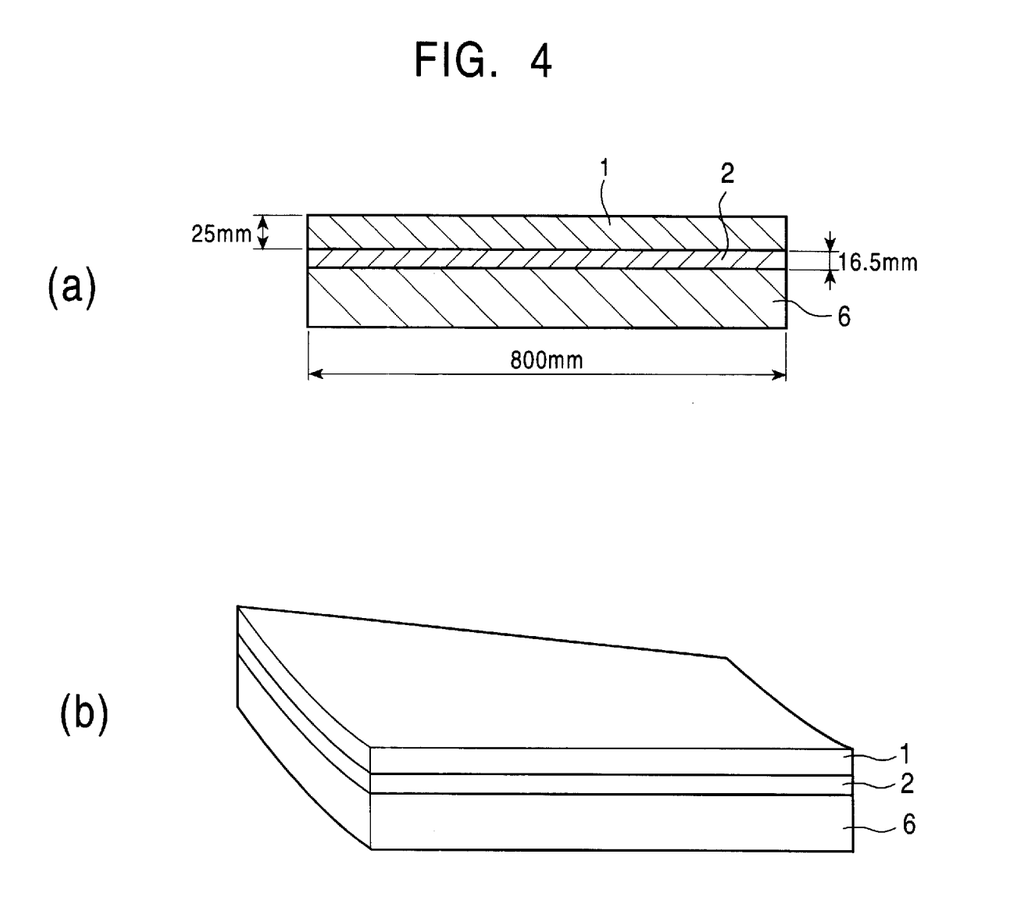
FIG. 4(a) is a vertical cross-sectional view of a stacked arrangement.
FIG. 4(b) is a perspective view of the stacked arrangement. (condition 1)
Figure 5:
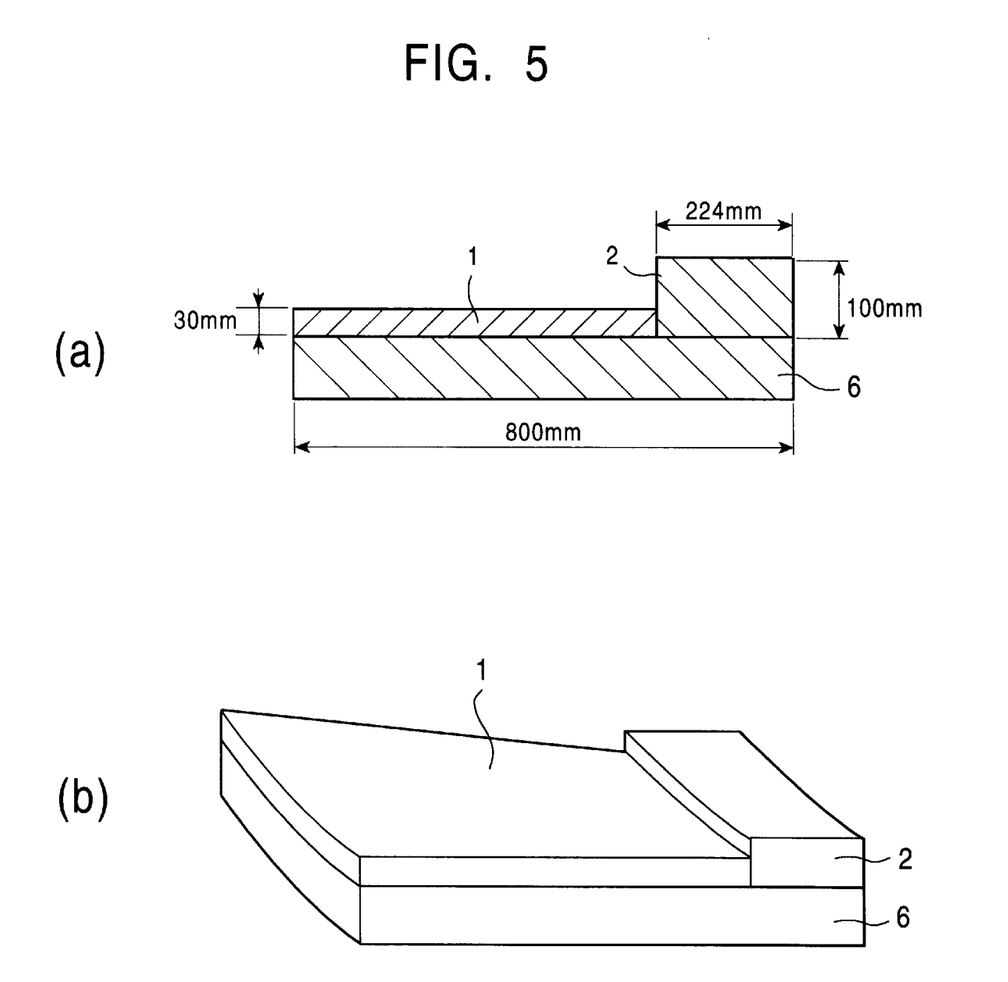
FIG. 5(a) is an alternative vertical cross-sectional view of a stacked arrangement and FIG. 5(b) is a perspective view of the stacked arrangement. (condition 2)
Figure 6:
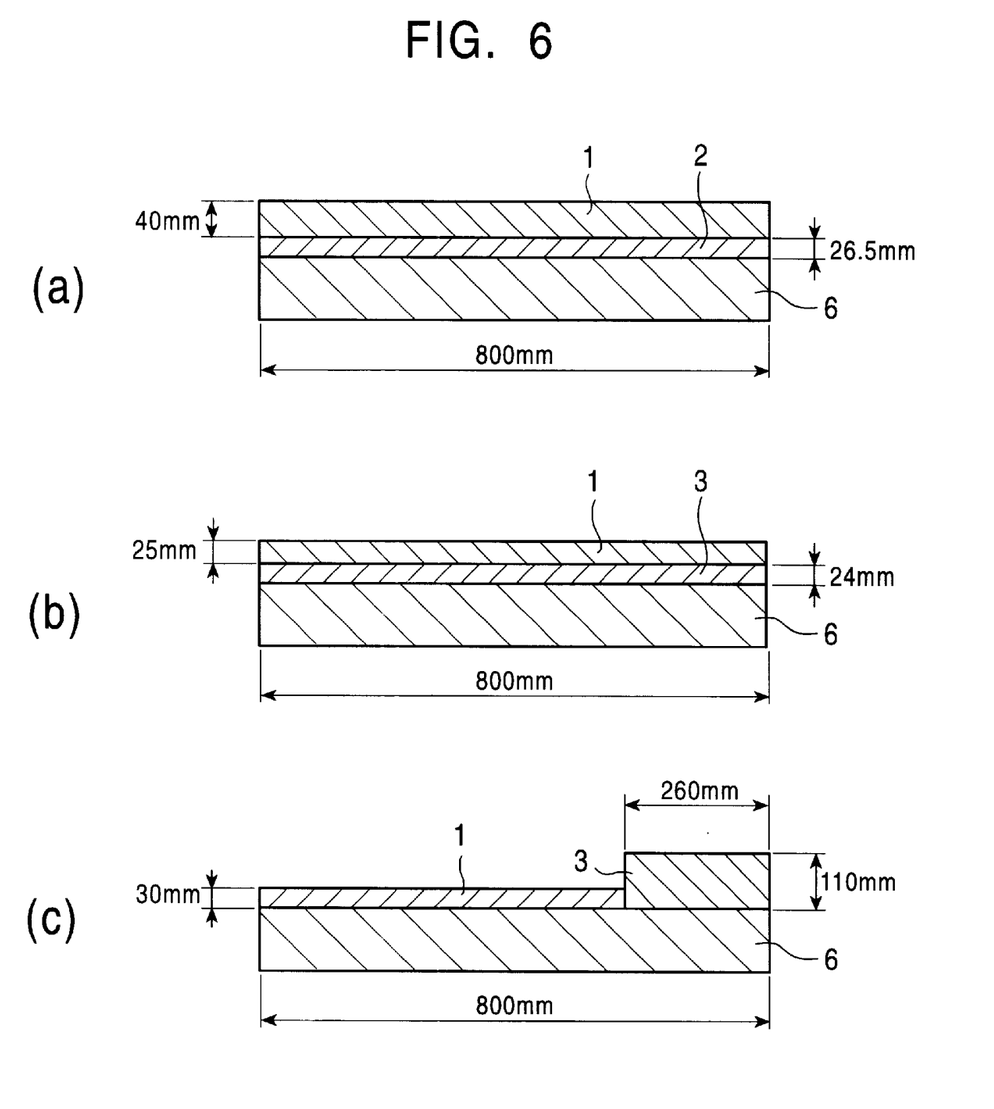
FIG. 6(a) is a vertical cross-sectional view of another alternative stacked arrangement (condition 3)
FIG. 6(b) is a vertical cross-sectional view of another stacked arrangement (condition 4)
FIG. 6(c) is a vertical cross-sectional view of still another stacked arrangement (condition 5).
Figure 7:
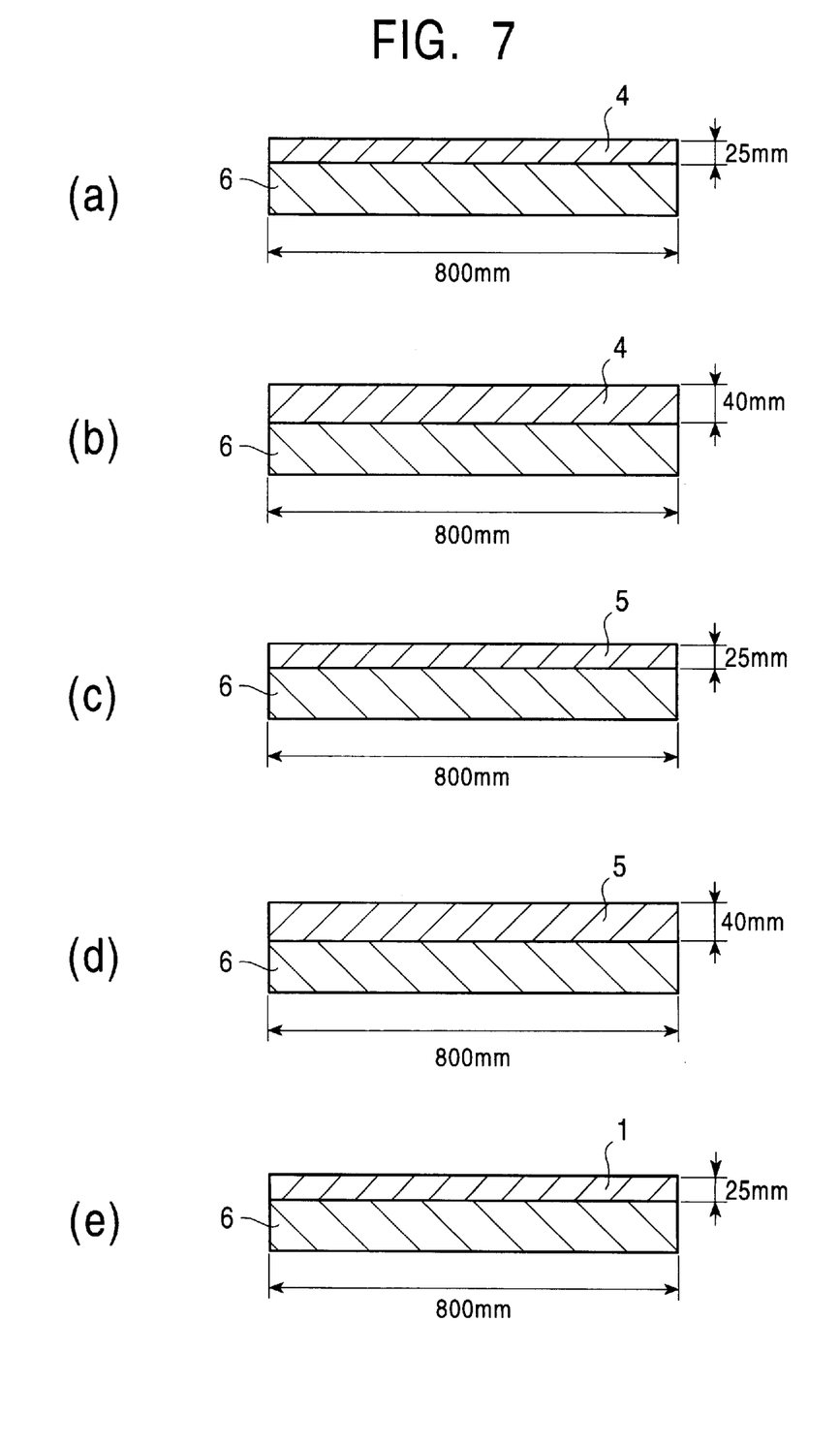
FIG. 7(a) is a vertical cross-sectional view of a stacked arrangement (condition 6)
FIG. 7(b) is a vertical cross-sectional view of a stacked arrangement (condition 7)
FIG. 7(c) is a vertical cross-sectional view of a stacked arrangement (condition 8)
FIG. 7(d) is a vertical cross-sectional view of a stacked arrangement (condition 9)
FIG. 7(e) is a vertical cross-sectional view of a stacked arrangement (condition 10).

Using a rotary hearth furnace, shown in FIG. 3, provided with a rotary hearth having a diameter of 2.2 m, a burner installed in an upper portion of the furnace, and a furnace body surrounding them entirely, a test operation was conducted as follows. In FIG. 3, 6 is a moving (rotary) hearth, 7 is a discharging apparatus, 12 is a charging apparatus, 13 is a furnace body, 14 is a burner, and 15 is a cooler installed upstream of a discharging port for cooling product before being taken out of the furnace.

Feed stock was stacked on the moving hearth 6 at a supply port. Specifically, fine ore and a solid reducing material were stacked by the charging apparatus 12 in accordance with ten conditions shown in FIGS. 4 to 7 which are views explaining those stacking conditions. In FIGS. 4 to 7, 1 is a mixed layer of fine ore and fine coal char, 2 is a layer of fine coal, 3 is a mixed layer of fine coal and fine coal char, 4 is a mixed layer of fine ore and fine coal, 5 is a mixed layer of fine ore, fine coal and fine coal char, and 6 is a moving hearth.

Figure 8:
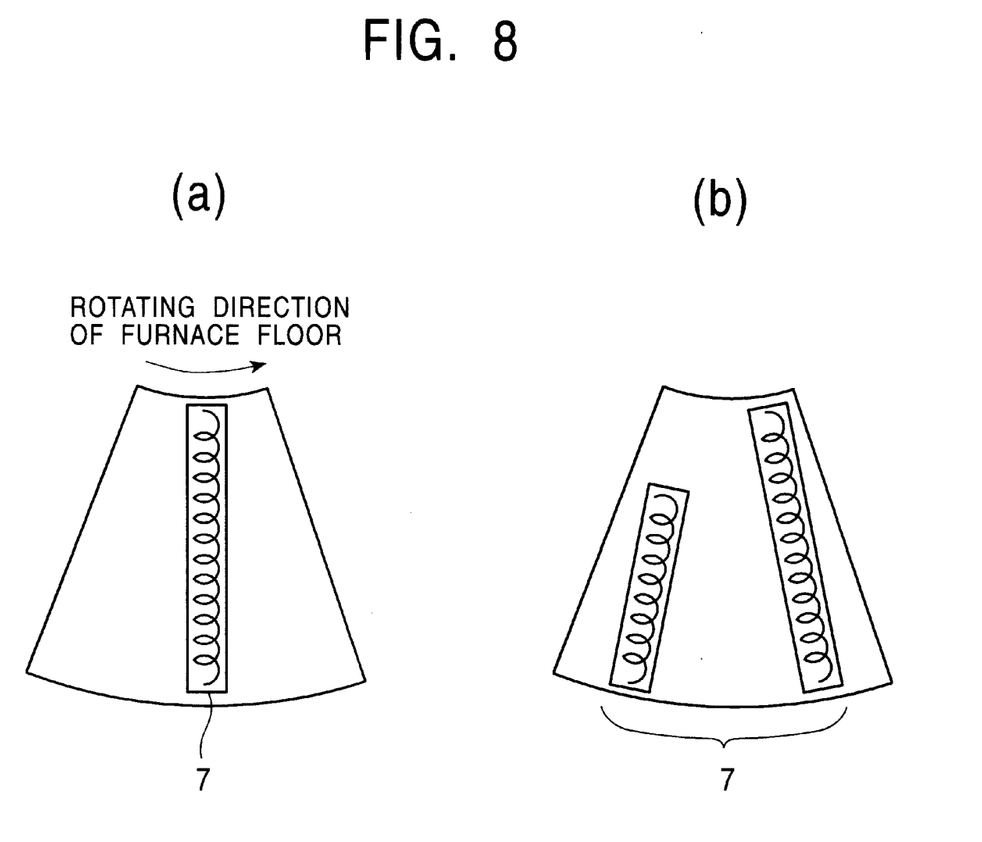
FIG. 8 is an explanatory view of a screw type discharging apparatus used in the invention.

As the discharging apparatus 7, two screw type discharging apparatus, shown in FIGS. 8(*a*) and 8(*b*), were used depending on the stacking conditions. Specifically, a discharging apparatus having two screws different in length from each other, shown in FIG. 8(*b*), was employed corresponding to the stacking conditions 2 and 5, and a discharging apparatus, shown in FIG. 8(*a*), was employed corresponding to the other stacking conditions.

The fine ore used had ingredient compositions shown in Table 1 and the fine coal used had a volatile matter of 44% and an ash matter of 10.2%. The fine ore, the fine coal, and the fine coal char were used after being screened with a mesh size of 3 mm. In the reducing operation, the furnace temperature was controlled to a fixed temperature of 1300° C. for any of the stacking conditions through combustion control of the burner, and the rotational speed of the hearth 6 was changed to adjust the residence time of the feed stock in the furnace so that the products had a rate of metallization in the range of 92~93%.

The experiment conditions (stacking conditions) and the results obtained by the test operation are listed in Table 2. In Table 2, the produced coal char was used repeatedly in examples in conformity with the present invention. In the conformed examples represented by the experiment Nos. 1, 3 and 4, since reduced iron and coal char were recovered in the mixed form, they were separated from each other by magnetic screening and the recovered coal char was used repeatedly. Also, in the conformed examples represented by the experiment Nos. 2 and 5, since reduced iron and coal char were recovered separately from each other, the recovered coal char was used directly.

On the other hand, in any of comparative examples represented by the experiment Nos. 6 to 9, fine coal was mixed in the layer of fine ore although those comparative examples were different from each other in the stacking condition of the feed stock and in whether the coal char is mixed or not. In the comparative examples represented by the experiment Nos. 8 and 9 and in another comparative example represented by the experiment No. 11, the coal char was produced in advance by using a separate apparatus. As seen from Table 2, in any of the comparative examples represented by the experiment Nos. 6 to 9, the production rate obtained when holding the rate of metallization of the products in the range of 92~93% was in the range of 3.5~3.9 t/d. In the comparative example represented by the experiment No. 10, the residence time of the feed stock in the furnace was shortened in comparison with the comparative example represented by the experiment No. 6 to thereby forcibly increase the production rate up to 4.3 t/d. As a result, the rate of metallization of the product was 82% and did not reach the target value.

By contrast, in any of the conformed examples represented by the experiment Nos. 1 to 3, all of the coal char produced in the furnace was used repeatedly by being mixed in the layer of fine ore and the fine coal was supplied in the form of a separate layer rather than being mixed with the fine ore, although those conformed examples were different from each other in the stacking conditions of the feed stock on the rotary hearth. In those conformed examples, the production rates were in the range of 4.4~4.5 t/d, meaning that the productivity was improved 20~30% in comparison with the above-mentioned comparative examples. Also, the rates of metallization of the products in those conformed examples were in the range of 92~93%, i.e., within the target range. In the conformed examples represented by the experiment Nos. 4 and 5, all of the coal char produced in the furnace was used repeatedly by being mixed in both the layer of fine ore and the layer of fine coal. Comparing with the conformed examples represented by the experiment Nos. 1 to 3, since the coal char mixed with the fine ore is carbonized more sufficiently, the mixed layer of the fine coal and the coal char was less affected by heat absorption incidental to the pyrolysis of coal, resulting in the further improved production rate in the range of 4.6~4.7 t/d.

In the comparative example represented by experiment No. 11, reduced iron was manufactured by producing the coal char in advance by using a separate apparatus and stacking the produced coal char in a mixed arrangement with the fine ore in accordance with the stacking condition 10. Since a charcoal material mixed in the fine ore was the coal char, the productivity was comparable to that in the examples in conformity with the present invention, but other factors pushed up the total cost, e.g., the construction cost for a coal char producing apparatus and the production cost using the apparatus.

TABLE 1

| Combined water % | T. Fe % | FeO % | SiO$_2$ % | Al$_2$O$_3$ % | CaO % | MgO % | P % | S % |
|---|---|---|---|---|---|---|---|---|
| 3.25 | 62.30 | 0.11 | 4.31 | 2.60 | 0.04 | 0.05 | 0.075 | 0.014 |

TABLE 2

| Experiment No. | Conditions on material supply site | | | | | | | | | State of discharged products | | | | | |
|---|---|---|---|---|---|---|---|---|---|---|---|---|---|---|---|
| | Layer containing fine ore | | | | Layer of only fine coal materials | | | Supply speed of fine coal char (t/d) | Stacking condition | Production rate of reduced iron (t/d) | Rate of metallization (%) | Discharging speed of coal char (t/d) | Residence times (min) | *5 | Remarks |
| | *1 | *2 | *3 | *4 | *2 | *3 | *4 | | | | | | | | |
| 1 | 81.1 | 18.9 | | 7.62 | | 100.0 | 2.34 | 1.44 | 1 | 4.42 | 92.3 | 1.44 | 24.9 | (a) | Conformed Example |
| 2 | 81.1 | 18.9 | | 7.67 | | 100.0 | 2.36 | 1.45 | 2 | 4.45 | 92.2 | 1.45 | 24.8 | (b) | Conformed |

TABLE 2-continued

| | Conditions on material supply site | | | | | | | | State of discharged products | | | | | |
|---|---|---|---|---|---|---|---|---|---|---|---|---|---|---|
| Experiment | Layer containing fine ore | | | | Layer of only fine coal materials | | | Supply speed of fine coal char (t/d) | Stacking condition | Production rate of reduced iron (t/d) | Rate of metal- lization (%) | Discharging speed of coal char (t/d) | Residence times (min) | *5 | Remarks |
| No. | *1 | *2 | *3 | *4 | *2 | *3 | *4 | | | | | | | | |
| 3 | 81.1 | 18.9 | | 7.62 | | 100.0 | 2.36 | 1.44 | 3 | 4.41 | 92.9 | 1.44 | 39.9 | (a) | Conformed Example |
| 4 | 81.1 | 18.9 | | 7.98 | 30.0 | 70.0 | 3.53 | 2.56 | 4 | 4.62 | 92.8 | 2.56 | 23.8 | (a) | Conformed Example |
| 5 | 81.1 | 18.9 | | 8.05 | 30.0 | 70.0 | 3.55 | 2.58 | 5 | 4.66 | 92.6 | 2.58 | 22.5 | (b) | Conformed Example |
| 6 | 68.9 | | 31.1 | 7.15 | | | | | 6 | 3.52 | 92.3 | 0.20 | 26.6 | (a) | Comparative Example |
| 7 | 68.9 | | 31.1 | 7.13 | | | | | 7 | 3.51 | 92.4 | 0.20 | 42.6 | (a) | Comparative Example |
| 8 | 73.9 | 9.4 | 16.7 | 7.44 | | | | 0.70 | 8 | 3.92 | 92.9 | 0.22 | 25.5 | (a) | Comparative Example |
| 9 | 73.9 | 9.4 | 16.7 | 7.35 | | | | 0.69 | 9 | 3.88 | 92.1 | 0.23 | 41.4 | (a) | Comparative Example |
| 10 | 68.9 | | 31.1 | 8.41 | | | | | 6 | 4.30 | 82.1 | 0.38 | 22.6 | (a) | Comparative Example |
| 11 | 81.1 | 18.9 | | 7.63 | | | | 1.44 | 10 | 4.42 | 92.2 | 0.11 | 24.9 | (a) | Comparative Example |

*1 Fine ore (mass %)
*2 Fine coal char (mass %)
*3 Fine coal (mass %)
*4 Supply speed (t/d)
*5 Discharging apparatus used

INDUSTRIAL APPLICABILITY

According to the present invention, when reducing ore in a moving hearth furnace, a mixed layer of fine ore and coal char and a layer of fine coal including coal char in some cases are stacked on a hearth in the form of separate layers from each other. In such a state, the ore is reduced while the fine coal is subjected to pyrolysis to turn into coal char which is used repeatedly in some cases for subsequent reducing cycles.

With the present invention, productivity can be increased using equipment having the same scale. In other words, given the same productivity, a scale of the equipment can be reduced. The present invention thus greatly contributes to improving productivity and reducing a cost.

What is claimed is:

1. A method of operating a movable hearth furnace, wherein fine ore, fine coal and coal char are used as feed stock, said feed stock are supplied and stacked in the form of layers on a hearth moving horizontally, and ore is heated and reduced with radiant heat transfer from an upper portion of a furnace, said method comprising the steps of:

stacking a mixed layer of said fine ore and said coal char and a layer of said fine coal in the form of separate layers from each other, reducing said fine ore, and pyrolyzing said fine coal to produce coal char.

2. The method of operating a movable hearth furnace according to claim 1, wherein said moving hearth is a rotary hearth.

3. The method of operating a movable hearth furnace according to claim 1 or 2, wherein said produced coal char is recovered and used as said coal char in the mixed layer of said fine ore and said coal char.

4. The method of operating a movable hearth furnace according to claim 1 or 2, wherein said method comprises the steps of stacking the mixed layer of said fine ore and said coal char and a mixed layer of said fine coal and said coal char in the form of separate layers from each other, reducing said fine ore, and pyrolyzing said fine coal in the mixed layer of said fine coal and said coal char to produce coal char.

5. The method of operating a movable hearth furnace according to claim 4, wherein said produced coal char is recovered and used as said coal char in the mixed layer of said fine ore and said coal char and/or said coal char in the mixed layer of said fine coal and said coal char.

* * * * *